Figure 1:
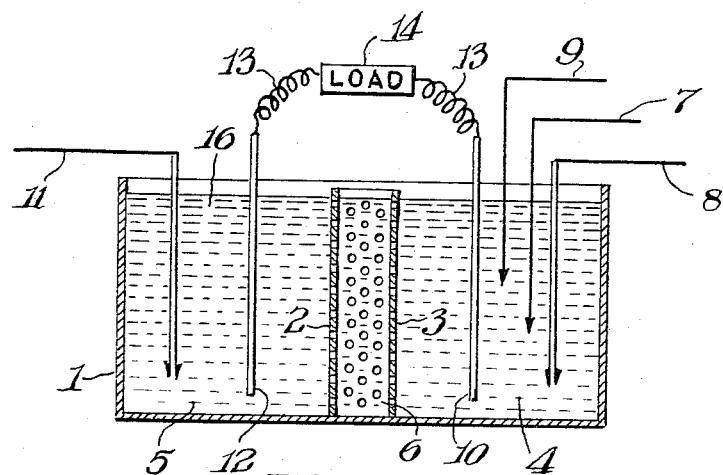

July 18, 1967

J. B. DAVIS ET AL 3,331,848

MICROBIAL OXYGENATED FUEL CELL

Filed July 11, 1962

Inventors
John B. Davis &
Henry F. Yarbrough

By Oswald G. Hayes

Attorney

United States Patent Office 3,331,848
Patented July 18, 1967

3,331,848
MICROBIAL OXYGENATED FUEL CELL
John B. Davis and Henry F. Yarbrough, Dallas, Tex., assignors to Mobil Oil Corporation, a corporation of New York
Filed July 11, 1962, Ser. No. 209,087
9 Claims. (Cl. 136—86)

This invention relates to microbial fuel cells and, more particularly, it relates to fuel cells in which hydrocarbons are used indirectly as an energy source. Still more particularly, it relates to the generation of electrical power by the use of micro-organisms and a fuel which contains carbon, hydrogen and oxygen, such as products obtained from the oxidation of hydrocarbons.

It is well known that biological reduction- oxidation reactions are a source of electrical energy. However, this source has not been exploited for a number of reasons. One of the reasons is that the known metabolic processes, while creating a potential, are unable to sustain it and only negligible power has been produced.

Thus, an objective of this invention is the provision of a method for sustaining the electrical output of microbial fuel cells. Another purpose is supplying fuels and reactions which afford the spontaneous production of electrical energy. A still further aim is to utilize metabolic processes of micro-organisms to produce electrical energy. Another object is to prepare oxygenated fuels by the use of microbes and to continue the oxidation of these fuels by the use of micro-organisms in such a manner to produce electrical power. These and other objects will appear hereinafter.

The purposes of this invention are accomplished by several steps one of which is charging a half-cell of a fuel cell with a fuel containing carbon, hydrogen and oxygen, such as a product of microbial oxidation of a hydrocarbon and injecting a microbial culture capable of oxidizing the fuel. The culture may be one grown on a hydrocarbon or it may be some other culture. In any event, the half cell is kept under anaerobic conditions in the presence of an anode. In another step a second half-cell is simultaneously charged with an oxidizing environment in the presence of a cathode while separating the two half-cells by a semipermeable membrane to maintain the said anaerobic and aerobic conditions and to permit the flow of hydroxyl or oxide ions, the said anode and cathode being connected by an electrical conductor through a load receiving element. Thus, the process of this invention produces useful electric power from metabolic processes of microbes. These organisms convert or oxidize hydrocarbons, and in turn the cells themselves and the chemicals therein become fuel. However, under the conditions of this invention the main fuel is the extracellular material, the utilization of intracellular products as the only fuel source being described and claimed in copending application Ser. No. 209,086 now Patent No. 3,305,399 filed on July 11, 1962. In the process of the present invention with the oxidation of the added oxygenated material at an anode, electrons are released to an external circuit, which generally has a load-bearing unit in it, and these electrons at the cathode, which is bathed in oxygen, reduce oxygen to oxides. These in turn travel through an electrolyte to the anode to complete the circuit.

This invention will be further understood by reference to the example and figures which are given for illustrative purposes only and are not limitative.

Figure 2:
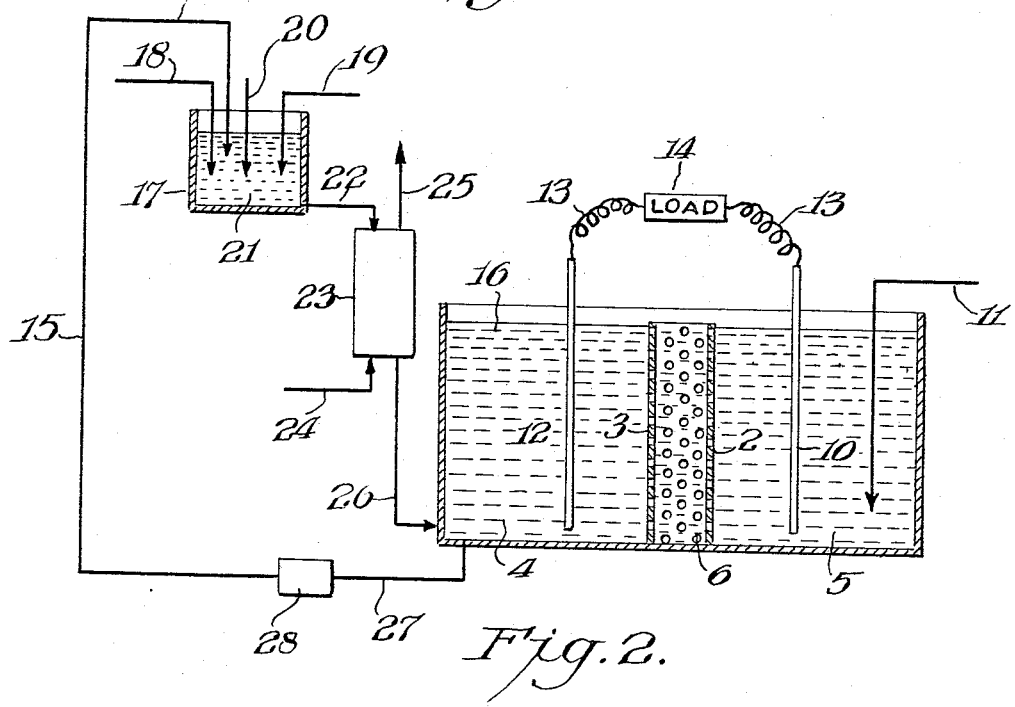

FIGURE 1 is a line diagram showing the relationship of the half-cells, the membrane, the electrodes and the load; and FIGURE 2 is a similar diagrammatical view showing a means of preparing a microbial culture fuel cell mixture separately and adding the mixture to the cell.

From FIGURE 1 it will be seen that a vessel 1 is divided by membranes 2 and 3 into three compartments: the half-cell 4, the half-cell 5, and the separator cell 6. The half-cell 4 is the anaerobic cell; it has microbes or a feed line 7 for microbes in it, a feed line 8 for food for the microbes, if such separate feed is desired, a feed line 9 for a hydrogen acceptor or other additives if such are being used and an anode 10. The half-cell 5 has in it a feed line 11 for oxygen and nearby a cathode 12. The cathode and the anode are connected through wire 13 to a load bearing device 14. The liquid material 16 is a salt solution such as, for example, a 1% to 3% aqueous solution of sodium chloride buffered to a pH of 7 with disodium acid phosphate and potassium dihyrdogen phosphate. In many instances no inlets at all are used, the materials being transferred in bulk. It will also be appreciated that the biological half-cell, as can the other, may be equipped with means to remove spent or undesired material, such as a drainage valve or recycling means line 27, pump feed 28 and feed line 15 (FIGURE 2).

Using equipment and substantially neutral, non-toxic conductive solutions as those described above, the microbial metabolic process in which extra-cellular fuel is consumed creates a half-cell potential in the presence of at least one anode in the biological half-cell relative to the potential in the cathodic half-cell. For the latter, generally oxygen is made to contact an electrode. The resultant aerobic cathode is kept separated from the anaerobic anode by the presence of a permeable membrane and preferably by two such membranes located fairly near each other and separating the vessel into three compartments, these being the cathodic half-cell, the walled section and the anodic half-cell. Into the walled section 6, both membranes creating it being permeable, is bubbled oxygen-free nitrogen. Thus, the aerobic and anaerobic cells are effectively separated and no oxygen permeates into the anaerobic half-cell. Any nitrogen permeating into the cathode is very small in amount and is harmless. For completion of the electrical circuit a wire 13 connects the anode 10 and cathode 12 and the electric current is made to do work at load 14.

As an example, a certain extra-cellular material being metabolized by bacteria is converted to hydrogen ions and electrons by such changes as the following in which is taken as an example $C_4H_8O_3$, beta-hydroxybutyric acid, an extra-cellular product utilized in this invention:

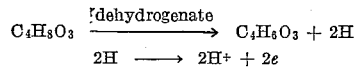
$$C_4H_8O_3 \xrightarrow{\text{dehydrogenate}} C_4H_6O_3 + 2H$$
$$2H \longrightarrow 2H^+ + 2e$$

or $$2H + 2OH^- \longrightarrow 2H_2O + 2e$$

this occurring in the anodic cell. Dehydrogenation is the first step. The electrons pass via the wire to the other half-cell leaving the biological half-cell with a positive potential. To this anodic half-cell are attracted hydroxyl ions which are being formed at the electrode bathed by oxygen,

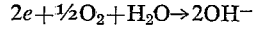
$$2e + \tfrac{1}{2}O_2 + H_2O \rightarrow 2OH^-$$

and the electric circuit is complete. The hydroxyl ions migrating from the non-biological half-cell leave the electrode there with a positive charge so that the metallic electrode becomes positive to attract more electrons from the biological half-cell. The hydroxyl ions migrate to the anode through the surrounding electrolyte.

This can be a solution of a wide variety of salts or mixtures of salts. Most frequently the electrolyte will be a culture medium in which the microbes grow well. For example, the electrolyte can be a simple solution of one salt, sodium chloride, for example, or it may be a mixture of sodium, potassium and ammonium salts such as the nitrates, phosphates, sulfates and the acid salts of those. Usually, the pH is kept between about 6.0 to about 8.0, a pH of 7.0 being preferred. Nitrogen may be supplied in the form of urea or asparagine or similar organic forms providing neutrality and these are preferred to the nitrates or ammonium salts.

The fuel cells of this invention can be used in series or in parallel, if desired, to provide additional current.

In FIGURE 2 is shown a modified form of apparatus used in this invention. Vessel 17 is an oxidator equipped with an inlet 18 for microbial cultures and inlets 19 and 20 for air or oxygen, hydrocarbons and other materials as desired, such as nutrients. Thus, a medium 21 containing micro-organisms that are growing on hydrocarbons is formed. After substantial growth is obtained the medium 21 may be piped through inlet 22 into exchanger 23 in which the air or oxygen in medium 21 is replaced by nitrogen or some non-oxidative gas coming into container 23 via inlet 24. The air or oxygen admixed with nitrogen is flushed out exit 25. The resultant oxygen-free medium is then passed through pipe 26 into half-cell 4 for anaerobic respiration used in the production of the electric current. Recycling is effected by means of lines 27 and 15 and pump 28 as described above.

The invention will be further understood by reference to the examples given below. These are illustrative only and are not to be taken as limitative.

*Example I*

Into an oxidator 17 was placed 3 mg. of *Nocardia salmonicolor*, strain No. 107–332, being fed through 18 along with a culture medium made up of the following materials in the amounts indicated (g./l. of water): urea (1.0), disodium acid phosphate (0.3), potassium dihydrogen phosphate (0.2), magnesium sulfate septahydrate (0.2) and ferrous sulfate septahydrate (0.2). The oxidator is equipped with the inlets 19 and 20 for gaseous or other materials and through it fuel is fed to the Nocardia. This fuel is generally a hydrocarbon and preferably it is a gaseous hydrocarbon such as ethane, propane or n-butane or similar n-alkanes. It is fed admixed, usually about 10% to about 30%, with about 90% to about 70% of air.

The oxidator is equipped with an impeller and a sparger (not shown) to stir the reaction medium 21. The impeller is driven by a motor at high speeds and the mass is vigorously agitated. The sparger serves to feed the fuel into the mass. As a result a shearing action is imparted to the mass and to the cells and very large contact is made between the cells and the fuel. The equipment is further described in co-pending application S.N. 149,112, filed on Oct. 31, 1961.

In such equipment ethane is fed and rapid growth of the Nocardia results. The cells feed on the hydrocarbon and excellent yields of cells are obtained. The inexpensive hydrocarbon serves as food for getting substantial quantities of cells on hand for use in the fuel cell processes of this invention.

The resultant microbial suspension is then fed through pipe 22 into a cell 23 through which nitrogen is passed by way of pipe 24 to remove oxygen, and then it is passed to the anaerobic half-cell 4 which contains the anode while the cathode in half-cell 5 is kept under aerobic conditions. Nitrogen is generally bubbled through the partition 6 formed by the permeable membranes 2 and 3. In the presence of fuel in the anodic half-cell which fuel is mainly in the form of extra-cellular fuel from microbial cells a current is generated and is made to act on load device 14. The electrical power was measured as 115 mv., the reading of the apparatus in the absence of the cells being 50 mv. Methylene blue was added leading to a constant E.M.F. of 245 mv. Feeding of ethane to the anaerobic half-cell gave no increase in E.M.F.

This confirmed that nocardial cells could not metabolize ethane under anaerobic conditions even with methylene blue present. Thus, it appears that oxygen is required in the first step of the microbial oxidation metabolism of the hydrocarbon. Further, the desired effect might be accomplished by feeding an extra-cellular, oxygen-containing fuel.

Glucose was used as a typical compound of a fuel containing carbon, hydrogen and oxygen. It was added to the microbial culture in half-cell 4 along with stepwise additions of methylene blue. Upon addition of 0.5 mg. of the hydrogen acceptor the E.M.F. became 265 mv. Successive additions, stepwise, of 1.5, 4 and 10 mg. of the acceptor brought the E.M.F. to 295 and 305 and 300 mv. with milliamperes of 0.45 and 0.6 and 1.7, respectively, being produced. Upon addition of 35 mg. more of methylene blue, this being an excess, the current increased to 2 milliamperes.

Similar results were obtained when Mycobacteria were used in the anaerobic half-cell instead of the Nocardia, the oxygen containing fuel being glucose.

The methylene blue decolorizes as it is reduced in the anodic cell. It and the nocardial suspension can be cycled so that it periodically comes into contact with air and hydrocarbon and it is returned to the anaerobic half-cell. This oxidizes the hydrogen acceptor and it also rejuvenates the microbes. In an instance such as above when hydrocarbon is being fed the cells grow in the cyclic period building up stored cellular products so that those products consumed in the half-cell in its production of current are replaced. Glucose can be added batchwise or continuously as desired.

*Example II*

To a fermentor was added 2 liters of aqueous nutrient containing the following salts (grams/liter given in parentheses): ammonium sulfate (1.0), potassium dihydrogen phosphate (0.25), disodium hydrogen phosphate (0.25), sodium carbonate (0.1), magnesium sulfate septahydrate (0.2), calcium chloride (0.01), ferrous sulfate septahydrate (0.005) and maganese sulfate (0.002) and to this was added 8 mg. of ashed yeast extract per liter to insure the presence of trace elements required for bacterial growth. To the resultant electrolyte was added 100 ml. of a culture of *Nocardia salmonicolor*, strain M.O., and ethyl benzene and a small amount of n-octadecane. Incubation at 30° C. and a pH of 7.0 with strong agitation were continued until good yields of microbial cells and phenylacetic acid were obtained, maintaining the neutrality by buffering with sodium phosphate. The acid resulted from the oxidation of the hydrocarbon by the aerobic oxidation action of the Nocardia.

The oxidation was continued anaerobically by placing the product comprising phenylacetic acid, isolated from microbial cells or with the cells, into the half-cell 4 of the apparatus shown in FIGURE 1. The half-cell 4 was charged with other Nocardia if no cells were being added with the oxygenated hydrocarbon.

With the cathode being bathed with oxygen and the circuitry as shown, in the presence of methyl violigen the metabolic action of the cells on the extracellular product, phenylacetic acid, results in the production of current.

Following similar procedures as above and as described in copending application S.N. 850,015, filed Nov. 2, 1959 (U.S. Patent No. 3,057,784), n-butylcyclohexane was oxidized to cyclohexylacetic acid, n-propylbenzene to benzoic acid, n-nonylbenzene to benzoic acid using a Nocardia such as *Nocardia salmonicolor*, strain M.O. or strain No. 107–332 or *Nocardia corallina*. In each instance the further oxidation or dehydrogenation in the fuel cell produced current. In related experiments the extracellular acids, such as benzoic acid and phenylacetic acid, produced by hydrocarbon oxidizers are placed in fuel cells containing microorganisms which are not hydrocarbon oxidizers. These include *Escherichia coli*, *Aerobacter aerogenes*, the various rhizobia, clostridia and Azotobacter, among others. Thus, while frequently the organism oxidizing the hydrocarbon, if one is used, may be later used in the half-cell, it need not be.

Example III

To test the applicability of the process described in Example II, the Nocardia culture was replaced by a culture of *Pseudomonas aeruginosa* in one set of experiments and by *Mycobacterium paraffinicum* in another. A variety of hydrocarbons was oxidized including p-cymene, methyl cyclohexane and n-dodecylbenzene using also as a food source ethane, butane or heptane to prevent complete oxidation of the cyclic hydrocarbon, stopping it at the cyclic acid stage. In each case the cyclic carboxylic acid was successfully further metabolized under fuel-cell conditions, and an electric current resulted.

Again, *B. aliphaticium liquifaciens* is placed in the anaerobic cell and is fed the extracellular products produced by oxidizing methylcyclohexane with *Mycobacterium phlei*. Electric current is produced. Similarly, *Pseudomonas putida* is used to oxidize n-butylbenzene with n-hexane present, and the extracellular products are fed to a cell containing *E. coli* in the anaerobic half-cell.

Example IV

Under conditions similar to those described in Example II, ethane was oxidized to ethanol by *Pseudomonas methanica* in good yields. The product was transferred to a fuel-cell containing *Escherichia coli* which in the anaerobic environment utilized the fuel with attendant generation of current.

Example V

As an example of a facultative anaerobe a fuel-cell was charged with *Escherichia coli* and glucose was added as the oxygen containing fuel. A reduction-oxidation potential was effected and a current resulted. Prior to adding the *E. coli* the E.M.F. was 148 mv. and the voltage at a Heliopot resistance of 1000 ohms was 42. Upon the addition of the *E. coli* a very active suspension was obtained with the redox potential changing rapidly, the said values becoming 625 and 521, respectively, corresponding to about 0.5 milliampere.

The system contained 1% glucose and 1% sodium chloride in 0.05 molar phosphate buffer at a pH of 7.

The addition of a hydrogen acceptor, such as methylene blue, had no effect for this bacterium has its own "built-in" hydrogen acceptors.

In a number of other experiments a variety of fuels containing carbon, hydrogen and oxygen, being used instead of glucose, leads to the conclusion that any such fuel can be used. A listing includes phenylacetic acid, benzoic acid, cyclohexylacetic acid and many other products obtained by microbial action on hydrocarbons.

Example VI

The experiment of Example I was repeated using glucose, Nocardia grown on n-butane and methylene blue, the E.M.F. resulting being 340 mv. and the current being 0.2 milliampere. Potassium ferricyanide (1 mg.) was then added to the cathodic cell. A strong increase in current resulted, the E.M.F. going to 580 and the current to 2.5 milliamperes. Stepwise addition of the iron salt (4 additional 1 mg. portions) led to an E.M.F. of 600 mv. with 4.5 milliamperes of current.

In a further experiment using *E. coli* it was determined that greater current is produced when the potassium ferricyanide is present in both cells than when the iron salt is present only in the cathode. Its presence only in the biological half-cell does not lead to current.

Under conditions similar to those described in Example I above, *Nocardia salmonicolor* is grown in large quantities on n-butane while being exposed to light. The exposure hastens the oxidation and higher yields of extracellular products are produced. The entire mass is concentrated with the destruction of the cells and the reduction of the mass to a finely divided material, either as a suspension or powder. This mass is then fed to *Pseudomonas fluoroscens* in the anaerobic half-cell to produce an electric current.

In the above examples a negative electrode potential (open circuit voltage) of 200 mv. and a current as high as 0.5 milliampere is observed. When certain salts, potassium ferricyanide, for example, are added at both electrodes currents up to 4.5 milliamperes (at 600 mv.) are observed. Transistorized devices are activated to advantage. Hydroquinone, benzoquinone and other readily reversible redox reagents may be used instead of the ferricyanide salt.

From the above examples it will be noted that a large variety of microorganisms can be used in the processes of this invention. These include *Nocardia corallina*—strain M.O., *Nocardia paraffinae*, *Nocardia opaca*, *Pseudomonas nitrimethanica*, *Pseudomonas nitrimethanica* var. *citreus*, *Pseudomonas putida*, *Pseudomonas oleovorans*, *Pseudomonas aeruginosa*, *Pseudomonas fluoroscens*, *Mycobacterium phlei*, *Mycobacterium lacticola*, *Mycobacterium paraffinicum*—smooth strain, and *Mycobacterium paraffinicum*, among others. For best results when nocardia cells are being used in the anaerobic half-cell, a hydrogen acceptor is required. These are materials like methylene blue and methyl violigen, and their use is claimed and described in more detail and in a related aspect in copending application S.N. 209,088, filed July 11, 1962. The presence of a hydrogen acceptor is not needed to accomplish the purposes of this invention, for most of the large variety of microorganisms referred to above do not need the acceptor. It will be appreciated, however, that in the growing state these various microorganisms are usually kept in media that have pH values of about 6.0 to about 8.0, the pH being preferably 7.0. Buffers, such as phosphates like potassium dihydrogen phosphate, can be added to the oxidators to maintain the desired pH.

The media will contain a mineral salt mixture which will include salts like the carbonates, chlorides, sulfates, phosphates, molybdates and the cations are such materials as potassium, sodium, manganese, iron and the like. Generally, the oxidator is run at atmospheric pressure at a temperature of about 75° F. to about 115° F.

The hydrocarbon that is used may be a single hydrocarbon or a mixture and it may be gaseous, liquid or solid. Generally, the hydrocarbon is fed admixed with air, the mixture containing from about 15% to about 50% of gaseous hydrocarbon or about 1% to about 3% of liquid or solid hydrocarbon. Hydrocarbons that are used include methane, ethane, propane, n-butane, toluene, xylene, mesitylene, ethylbenzene, diethylbenzene, propylbenzene, butylbenzene, amylbenzene, hexylbenzene, heptylbenzene, octylbenzene, p-cymene, methylnaphthalene, ethylnaphthalene, methylcyclopentane, dimethylcyclopentane, trimethylcyclopentane, ethylcyclopentane, diethylcyclopentane, propylcyclopentane, butylcyclopentane, amylcyclopentane, hexylcyclopentane, heptylcyclopentane, octylcyclopentane, methylcyclohexane, dimethylcyclohexane, trimethylcyclohexane, tetramethylcyclohexane, ethylcyclohexane, propylcyclohexane, isopropyl-4-methylcyclohexane, butylcyclohexane, amylcyclohexane, hexylcyclohexane, heptylcyclohexane, and octylcyclohexane. Also, normal hydrocarbons can be used such as n-hexadecane, n-tetradecane, n-octadecane, n-eisocosane, and n-dodecane. Oily materials such as mineral oils, paraffins, crude oil, partially refined oil and the like may be used.

While it is preferred to obtain the extracellular, oxygen-containing compounds that are fed to the microorganisms in the anaerobic half-cell from hydrocarbons because of their low cost, it is to be appreciated that any oxygen-containing compound may be fed to the said living organism, providing, of course, the said organism can metabolize the material. Thus, the chemicals used may be obtained from natural sources including the natural proteins, fats, carbohydrates occurring in the animal or vegetable kingdoms or made from them. These materials include the albumins, globulins, prolamins, the amino-acids, the stearic, palmitic or oleic esters, the polysaccharides, starches, molasses, sorbitol, among others. These materials may be used in the fuel cells as described above with the production of electric current.

Of the various microorganisms that may be used the Nocardia are preferred. This is true because they are fast multipliers. For example, they multiply at a very rapid rate compared to Mycobacteria. The generation time of the Nocardia is about 30 minutes as compared to something like 24 hours for the Mycobacteria. Further, Nocardia grow very well on hydrocarbons and they are not limited in the kind and number of hydrocarbons that they can utilize as are some of the other organisms that are hydrocarbon oxidizers but only in a selective fashion. Still further, the fuels of this invention are extracellular materials. They are not used at the expense of cellular strength or life. Rather, they are a food contributing not only to cellular life but to the production of electric current. They are cheap naturally occurring materials or readily derived from cheap hydrocarbons by the action of living material to be used on the spot in the current producing step. The microorganisms act independently of their stored energy which in turn is obtained from inexpensive materials. The conversion of inexpensive hydrocarbons to electrical energy by the microbial processes of this invention affords an attractive route to electrical power production.

Although the processes described above use living organisms, it is readily appreciated that the processes involved are chemical and electrical processes or manners of new manufacture all of which require an operator who maintains the appropriate conditions and drives the microorganisms to the desired results.

While the invention has been disclosed herein in connection with certain structural embodiments and certain procedural details, it is clear that changes, modification or equivalents can be used by those skilled in the art; accordingly, such changes within the principles of this invention are intended to be included within the scope of the claims below.

We claim:
1. A process for obtaining electrical power from the metabolic processes of a microorganism capable of metabolizing an oxygen containing organic compound which comprises placing livng cells of the said microorganism in the anaerobic half-cell of a fuel-cell containing an electrolyte; adding to the said half-cell as an extracellular fuel an organic compound containing chemically bound oxygen and being a food for said microorganism; allowing said microorganisms to feed on said food at a pH of about 6.0 to about 8.0 thereby releasing electrons to an external circuit; reducing oxygen in the cathodic half-cell at a cathode connected to said external circuit; and allowing the resultant ions to flow through said electrolyte to said anode to complete the circuit.

2. A process in accordance with claim 1 in which said food is a naturally occurring substance.

3. A process for obtaining electrical power from metabolic processes of microorganisms capable of metabolizing hydrocarbons which comprises converting hydrocarbons to oxygenated, extracellular products by allowing said microorganisms to feed on said hydrocarbons, under aerobic conditions; placing the resultant extracellular fuel in the anaerobic, anodic half-cell of a fuel cell that contains an electrolyte and a microorganism capable of growing on the said product and by the metabolism of said cells at a pH of about 6.0 to about 8.0, releasing electrons to an external circuit; reducing oxygen in the cathodic half-cell at a cathode connected to said external circuit; and allowing the resultant ions to flow through said electrolyte to said anode to complete the circuit.

4. A process in accordance with claim 3 in which said microorganisms are Nocardia.

5. A process for obtaining electrical power from hydrocarbons and from metabolic processes of microorganisms capable of metabolizing hydrocarbons which comprises aerobically subjecting the hydrocarbons to the metabolic action of microorganisms; allowing the cells to grow and multiply and to convert said hydrocarbons into oxygenated extracellular products, placing the said products in the anaerobic, anodic half-cell of a fuel cell which contains living cells of a microorganism; allowing the cells to metabolize the said products at a pH of about 6.0 to about 8.0, thereby releasing electrons to an external circuit; reducing oxygen at a cathode connected to said external circuit; and allowing the resultant ions to flow through said electrolyte to said anode to complete the circuit.

6. A process in accordance with claim 5 in which said hydrocarbon is gaseous.

7. A process in accordance with claim 5 in which said hydrocarbon is a liquid.

8. A process in accordance with claim 5 in which said hydrocarbon is a solid.

9. A process in accordance with claim 5 in which said microorganism is a Nocardia.

References Cited

Bergy's Manual of Determinative Bacteriology, 7th ed., 1957, pp. 715–741.

Business Week, May 6, 1961, p. 68.

Journal of Bacteriology, vol. 21, January–June 1931, pp. 239–251.

Popular Science, January 1962, p. 29.

Proc. Royal Soc., London (Series B), Biological Papers, vol. 84, March 1912, pp. 260–276.

Science and Mechanics, August 1961, pp. 116–17.

WINSTON A. DOUGLAS, *Primary Examiner.*

JOHN R. SPECK, JOHN H. MAIK, *Examiners.*

H. FEELEY, *Assistant Examiner.*